United States Patent [19]
Barcza

[11] Patent Number: 5,111,992
[45] Date of Patent: May 12, 1992

[54] VARIABLE THROAT CONVERGENT/DIVERGENT NOZZLE

[75] Inventor: William K. Barcza, Stuart, Fla.

[73] Assignee: United Technologies Corporation, Hartford, Conn.

[21] Appl. No.: 687,667

[22] Filed: Apr. 19, 1991

[51] Int. Cl.$^5$ .......................... B64C 9/38; F02K 1/06
[52] U.S. Cl. ..................... 239/127.3; 239/265.19; 239/265.39; 60/266; 60/271
[58] Field of Search ............. 239/127.1, 127.3, 265.19, 239/265.33, 265.35, 265.37, 265.39, 265.41; 60/266, 271

[56] References Cited

U.S. PATENT DOCUMENTS

| | | | |
|---|---|---|---|
| 3,062,003 | 11/1962 | Hamilton | 239/127.3 |
| 3,302,889 | 2/1967 | DiSabato | 239/265.29 |
| 3,367,579 | 2/1968 | Mehr | 239/265.39 |
| 3,702,681 | 11/1972 | Hasbrouck et al. | 239/127.3 |
| 3,715,079 | 2/1973 | Thompson | 239/127.3 |
| 4,043,509 | 8/1977 | McHugh et al. | 60/271 |
| 4,081,137 | 3/1978 | Sutton et al. | 239/127.3 |
| 4,643,356 | 2/1987 | Holler et al. | 239/127.3 |

Primary Examiner—Andres Kashnikow
Assistant Examiner—Christopher G. Trainor
Attorney, Agent, or Firm—Edward L. Kochey, Jr.

[57] ABSTRACT

Cooling ambient air is induced through openings in the upstream portion of each divergent flap at intermediate throat areas where the nozzle pressure is below ambient pressure. A barometric damper in these openings prevents outflow of hot gases when operating near the minimum throat area and maximum throat area since the internal pressure is above ambient pressure during such operation.

2 Claims, 4 Drawing Sheets

VARIABLE THROAT CONVERGENT/DIVERGENT NOZZLE

TECHNICAL FIELD

The invention relates to convergent/divergent nozzles for aircraft and in particular to variable throat area nozzles for use with augmentors.

BACKGROUND OF THE INVENTION

Maximum thrust and operating efficiency of a gas turbine engine is achieved when the engine exhaust passes through an exhaust nozzle which controls the expansion of the exhaust gases. Maximum operating efficiency generally requires that the nozzle be configured to exit the exhaust stream at substantially the same pressure as the surrounding ambient atmosphere.

With aircraft operating both at subsonic and supersonic speed the exhaust nozzle pressure ratio varies over a wide range. Variable throat convergent/divergent nozzles are used to achieve proper operation for the various operating conditions.

These gas turbine engine nozzles operate with gas at an extremely high temperature level such that cooling of the nozzle surfaces is required. A known method includes passing a forced flow of cooling air through a liner which is lining both the convergent flaps and the convergent seals. This cooling flow is then dumped at the throat adjacent to the surface of the divergent section to film cool that section.

Various amounts of cooling air are required to properly cool the divergent section at various operating conditions. In accordance with conventional practice however the air flow is established based on the maximum airflow which is required under the most adverse condition. This forced air flow continues to operate at other conditions where the full amount is not required for cooling. This excess use of cooling air takes air away from the combustor and gas turbine thereby decreasing the efficiency of the engine.

SUMMARY OF THE INVENTION

A variable throat nozzle is operated with different openings under different operating conditions. For operation without augmentation the minimum flow area is used. The maximum area is used for operation with augmentation when at high altitude. With augmentation at sea level and low altitude the nozzle operates with intermediate area.

The maximum gas temperature is experienced when operating with augmentation at sea level and low altitudes. In accordance with conventional practice this would dictate the forced air cooling requirement. In accordance with the invention however the forced flow cooling requirement is reduced to the maximum air requirement at either augmentation at high altitude or for operation without augmentation. The pressure level just after the throat of the nozzle is below ambient pressure during operation with augmentation at sea level and low altitudes. At these conditions provision is made to permit cooling air flow to be induced for film cooling the divergent flaps and seals.

Operation without augmentation as well as operation with augmentation at high altitudes can produce a positive pressure downstream of a throat. Accordingly a barometric damper in the induced air flow opening is closed whenever a positive pressure exists just beyond the throat of the nozzle. This will occur when the throat area is near either the maximum or minimum position.

Openings in the divergent flap contain a barometric damper. This permits an induced air flow from the ambient plenum surrounding the nozzle for cooling of the divergent sections whenever the throat pressure is less than the ambient pressure. The damper seals against reverse flow.

DESCRIPTION OF THE PREFERRED EMBODIMENT

Figure 1:
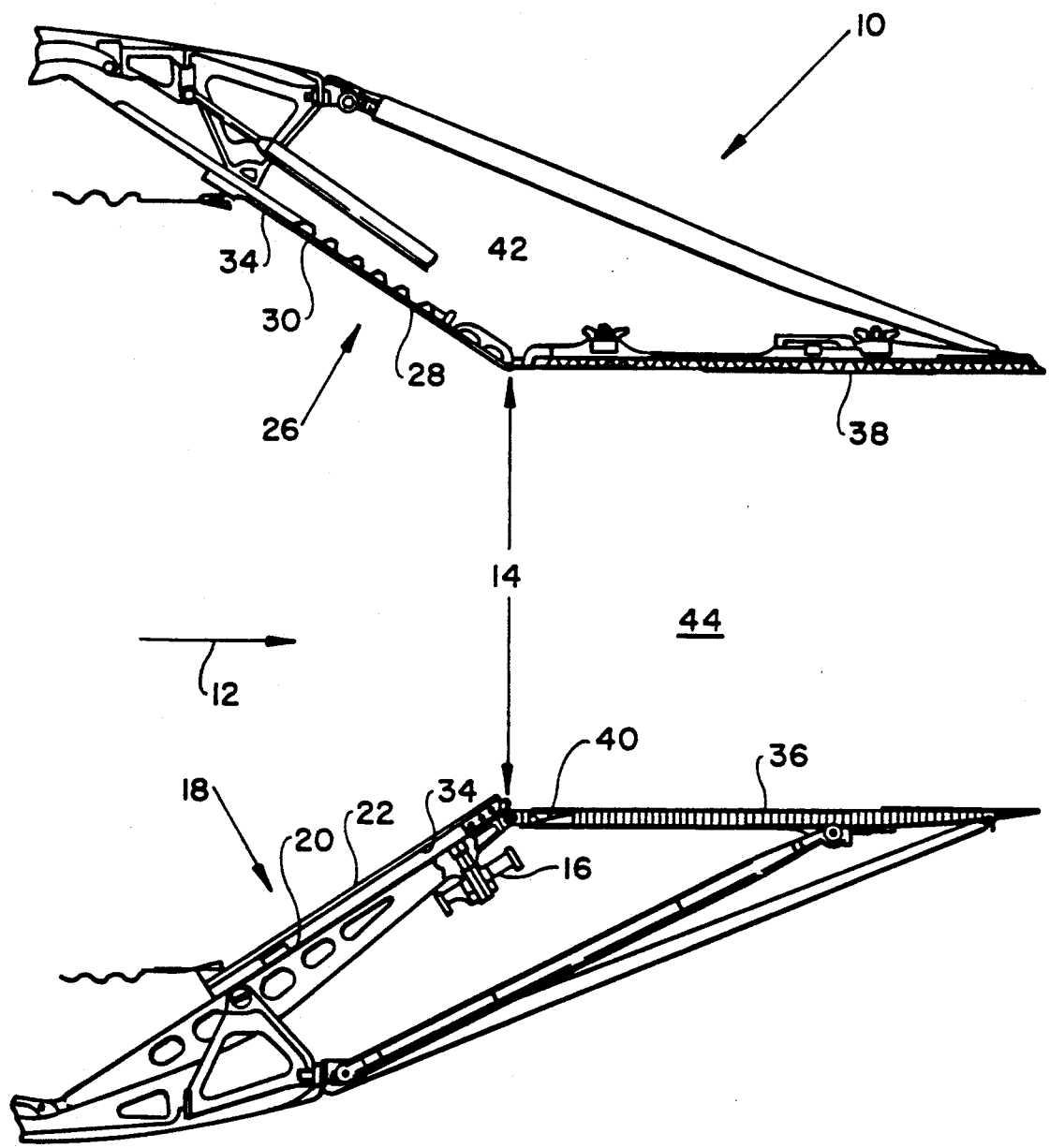
FIG. 1 is a section through a nozzle showing flaps at the bottom and seals at the top.

Referring to FIG. 1 convergent/divergent nozzle 10 is formed of a plurality of overlapping seal and flap assemblies. Gas flow 12 is passing through the nozzle where throat 14 is variable. Bell crank 16 operates to vary the diameter of the throat 14 and accordingly the flow area through this section.

Figure 2:
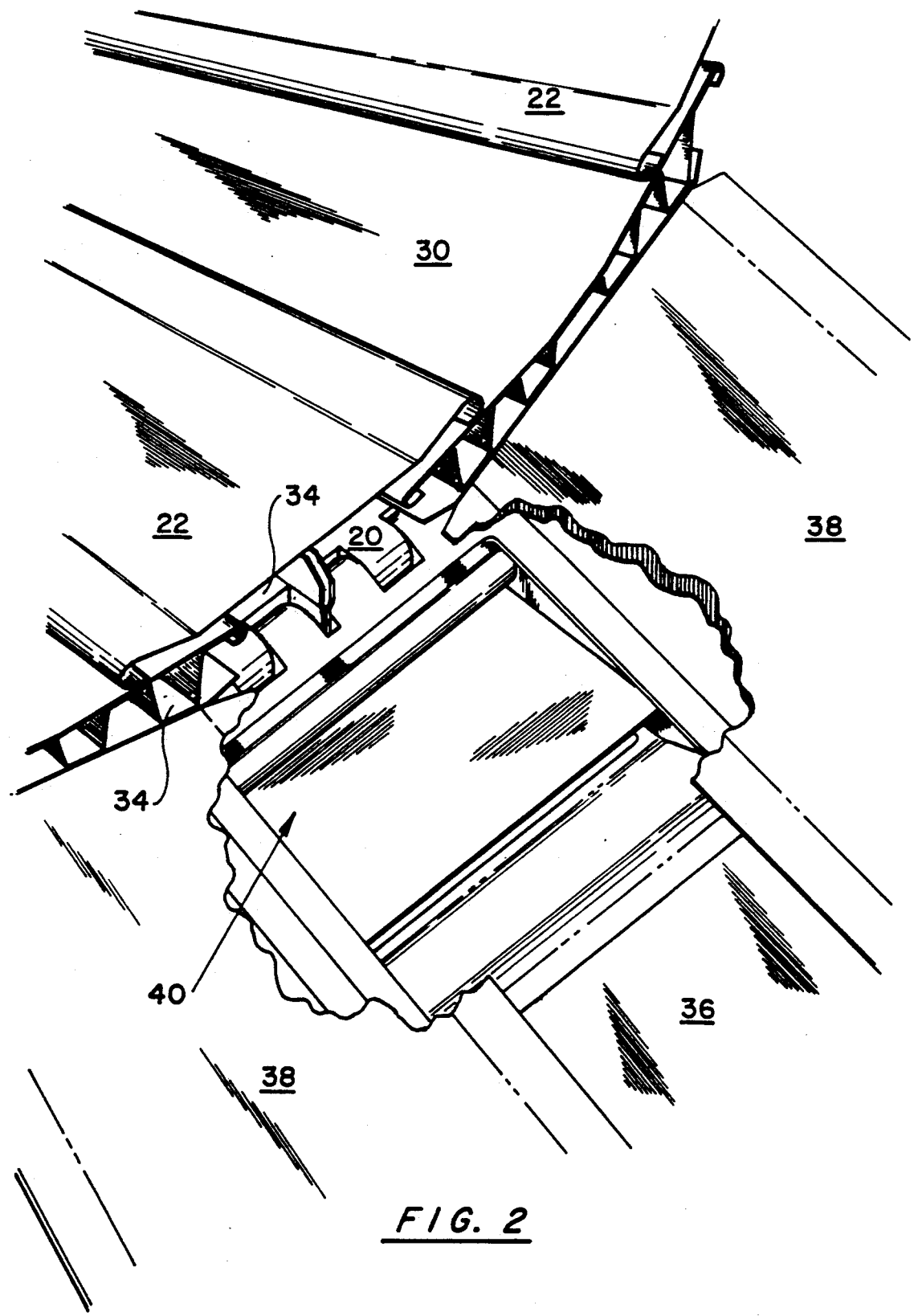
FIG. 2 is an isometric view of the throat area.

Referring also to FIG. 2 each convergent flap assembly 18 is comprised of a convergent flap 20 and a convergent flap liner 22.

Convergent seal assembly 26 includes the convergent seal 28 and convergent seal liner 30.

A forced flow air cooling path 34 passes between each convergent flap and flap liner and between each convergent seal and seal liner. This cooling air flow passes out for film cooling of divergent flaps 36 and divergent seals 38.

In FIGS. 1 and 2, there is shown a barometric damper 40 which is in fluid communication with ambient air plenum 42 and the interior 44 of the nozzle.

Figure 3:
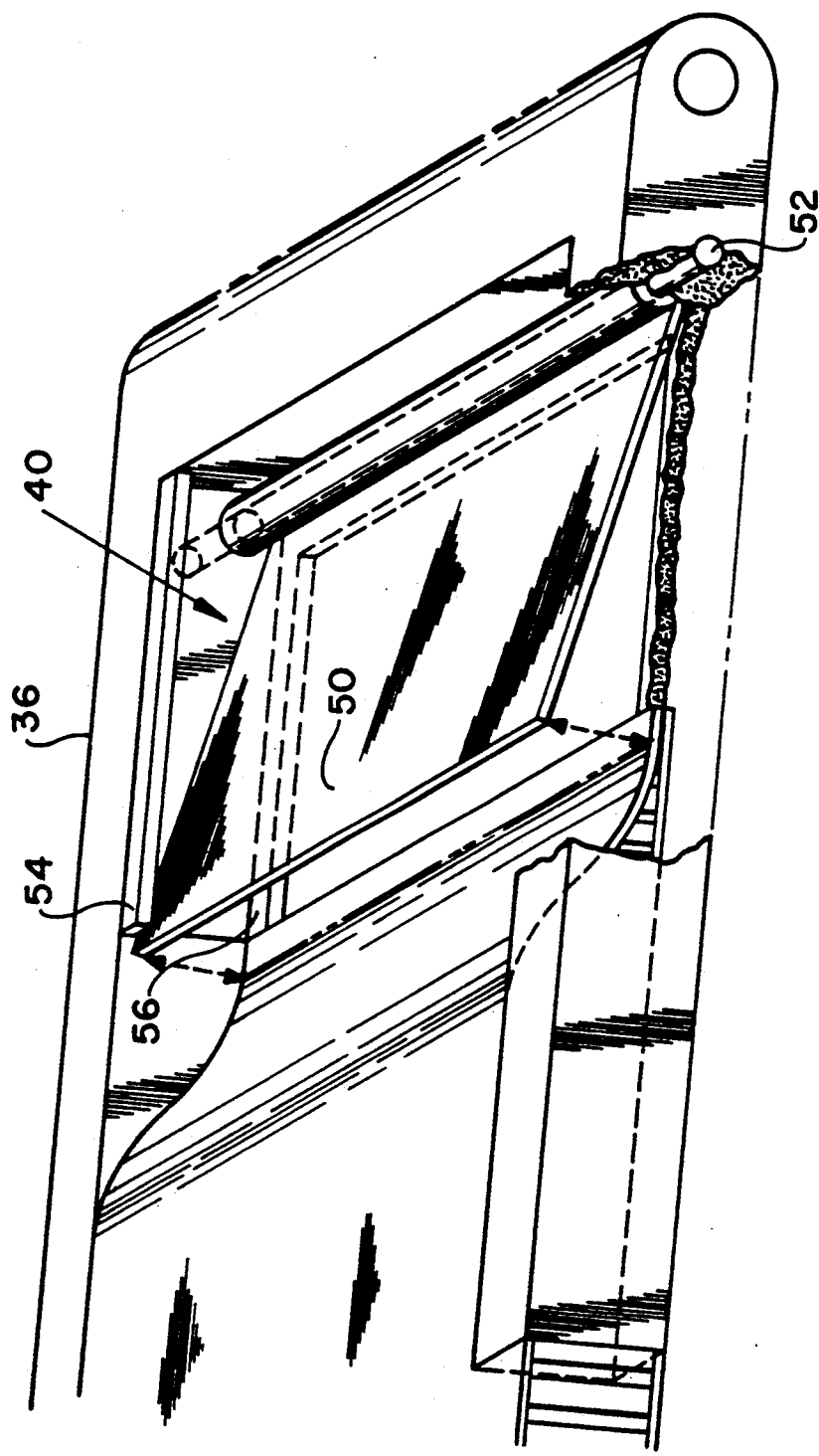
FIG. 3 is an isometric view of a flap with a barometric damper.

This damper is shown in more detail in FIG. 3 where gate 50 is pivotally mounted to hinge pin 52. Channels 54 limit the inward movement of the gate and provide a sealing surface 56 for the gate in the closed position. When the throat pressure is greater than the ambient pressure in chamber 42, the gate is forced against the sealing surface 56 preventing the escape of hot gas. This occurs at a time coincident with relatively low gas temperatures. This is operation at high altitude with augmentation and for operation without augmentation. With augmentation at sea level or at low altitudes a negative pressure occurs within the nozzle resulting in an opening of gate 50. This also is the time at which the maximum cooling air requirements occur. Accordingly, gate 50 opens during this operation supplying supplemental cooling air.

The forced flow cooling air through cooling path 34 is selected to provide sufficient cooling for other operating conditions, this flow being augmented by the induced airflow for augmentation at low altitudes.

Figure 4:
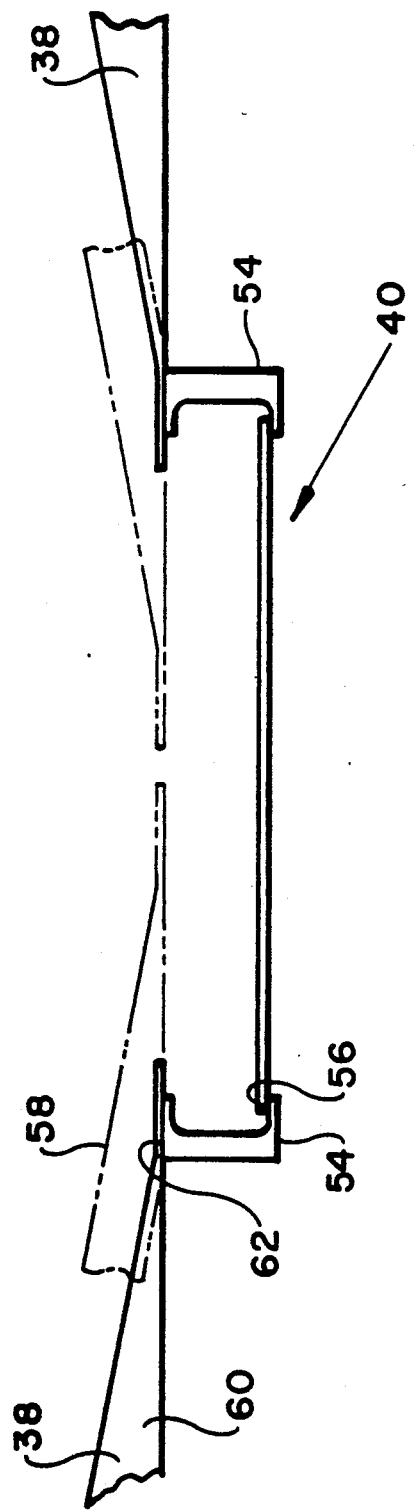
FIGS. 4, is a section through the damper showing the adjacent seals.

Referring to FIG. 4, divergent seals 38 move toward the phantom position 58 as the throat area of the nozzle is reduced. A transversely extending seal surface 60 on the outer surface of these seals maintains contact with the seal surface 62 surrounding the barometric damper 40, thereby maintaining the required seal between the flaps and the seals.

I claim:

1. A variable throat convergent/divergent nozzle for a gas turbine engine comprising:
   a plurality of convergent flap assemblies, each flap assembly comprising a convergent flap and a convergent flap liner;
   a plurality of convergent seal assemblies, each seal assembly comprising a convergent seal and a convergent seal liner;
   a plurality of divergent flaps;
   a plurality of divergent seals;
   a variable diameter throat formed at the junction of said convergent flaps and seals and said divergent flaps and seals, variable from a minimum area to an intermediate area and to a maximum area;
   a forced flow cooling path through said convergent flap liners;
   a forced flow cooling path through said convergent seal liners;
   an ambient air plenum surrounding said plurality of flaps and seals;
   a plurality of openings in the outer edges of the upstream end of said divergent flaps in fluid communication with the interior of said nozzle and with said plenum; and
   a barometric damper in each opening, permitting flow from said plenum into said interior of said nozzle, but not from said interior of said nozzle to said plenum.

2. A variable throat convergent/divergent nozzle as in claim 1 comprising also:
   transverse extensions on the outside of said divergent seals at the upstream portion of said divergent seals in contact with sealing surface of said divergent flap around said opening.

* * * * *